Jan. 7, 1969     JAMES E. WEBB     3,420,338
ADMINISTRATOR OF THE NATIONAL AERONAUTICS
AND SPACE ADMINISTRATION
HERMETIC SEALED VIBRATION DAMPER
Filed May 1, 1968
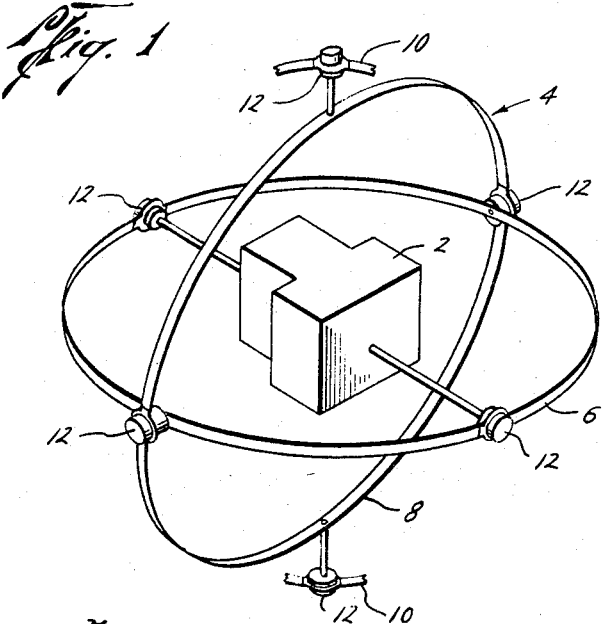
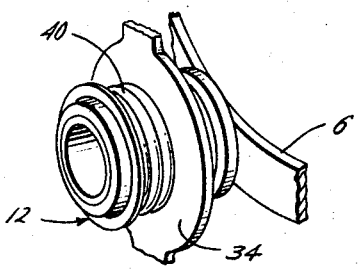
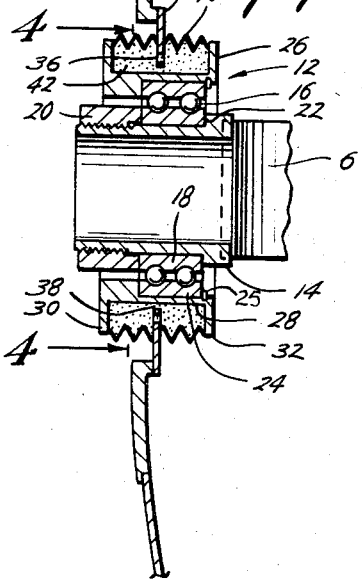
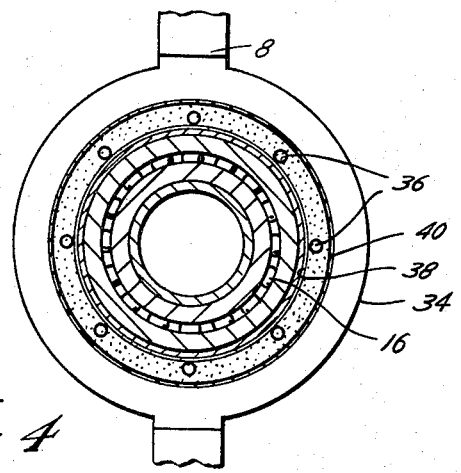
Donald G. Wheatley
INVENTOR.
BY *J H McCoy*
*Edward K. Fein*
ATTORNEY

United States Patent Office 3,420,338
Patented Jan. 7, 1969

3,420,338
HERMETIC SEALED VIBRATION DAMPER
James E. Webb, Administrator of the National Aeronautics and Space Administration with respect to an invention of Donald G. Wheatley, Livonia, Mich.
Filed May 1, 1968, Ser. No. 725,719
U.S. Cl. 188—1
Int. Cl. F16d 63/00
7 Claims

ABSTRACT OF THE DISCLOSURE

A fluid damper for lessening axial shock and vibration between supporting gimbals of a gyroscopic device comprising an annular channel through which one gimbal is journalled for free rotation, and an annular orifice plate surrounding the channel in sliding relationship thereto to which the cooperating gimbal is attached. A flexible bellows connected between the orifice plate and the channel contains a volume of damping fluid within the channel so that any axial movement between gimbals forces the fluid to pass through the orifices in the plate and the restricted space between the plate and channel, thus providing the desired damping.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Background of the invention

The instant invention relates to a hermetic sealed vibration damper particularly suitable for integration into the gimbal assembly of inertial measurement components of a spacecraft guidance system.

The inertial measurement unit (IMU) of a spacecraft is a gyroscopic device which provides information necessary to the guidance of the spacecraft in flight. This information is highly critical since the reliability and accuracy of the entire guidance system depends on the ability of the IMU to maintain preset references and provide accurate information. A stable element contains the necessary gyros and accelerometers and which must maintain preset references so as to provide requisite guidance information for spacecraft flight. This stable element is isolated from spacecraft motions by a servo-controlled, four-gimbal, three-axis structure. The function of the gyros in the stable element is to maintain references by sensing angular movement of the spacecraft and, through control electronics, drive torque motors on each gimbal axis to adjust angular position. Details of structure and function of the stable member and its supporting gimbal assembly are considered beyond the scope of this disclosure. Suffice it to say that these components are equipped to make the basic attitude and acceleration measurements for the spacecraft.

The quality of information provided by the inertial measurement unit depends on how well the gyros maintain inertial reference. Gyro imperfection can result in "gyro drift" rates. Where the gyro drift rate of a specific gyro is known and constant, this error can be compensated for. However, a major problem can result from a gyro drift rate which is not constant. Such a problem can result from vibrations on the system, particularly resulting from the environments of the launch and reentry phases of a mission.

The solution to this vibration problem lies in isolating the inertial sensors from external vibration. The outer housing cannot be shock-mounted due to certain structural requirements of the outer configuration. If isolators are to be used, they must be located within the outer housing. The solution seemed to lie in providing isolators at the pivotal mountings between gimbals. Resilient elastomeric isolators provided some degree of damping, but for capability in strong vibrations, a more sophisticated solution had to be found.

Summary of the invention

The instant invention provides a fluid damper assembly to reduce the effects of external vibration on the inertial sensors of a spacecraft guidance system. Fluid damping provides the degree of isolation necessary to offset the strong vibrations likely to be encountered in flight. An annular channel defines the bearing for the journal member on one gimbal of the assembly. The cooperating gimbal is attached to an annular orifice plate which closely surrounds the channel and reciprocally slides between the confines of the upright flanges of the channel. The channel is filled with damping fluid and sealed by means of a flexible bellows which is connected at each face of the orifice plate and the respective upright flange of the channel. The damping action is a result of the flow of damping fluid between the inner rim of the orifice plate and the base of hte channel and through the orifices of the plate whenever there is axial movement between gimbals.

Brief description of the drawings

Other and further objects and features of advantage will be apparent to those skilled in the art from the following detailed description of a preferred embodiment wherein reference is made to the accompanying drawings in which:

FIGURE 1 is a schematic view of the gimbal-mounted inertial measurement unit featuring the vibration dampers as disclosed herein between the gimbals;

FIGURE 2 is an enlarged perspective view of a vibration damper;

FIGURE 3 is a lateral section of the vibration damper of FIGURE 2; and

FIGURE 4 is a section as viewed along the line 4—4 of FIGURE 3.

Description of the preferred embodiment

Referring in more detail to the drawings, FIG. 1 shows schematically stable element 2 which contains the gyros and accelerometers, not shown, and considered beyond the scope of this disclosure. Stable element 2 is isolated from spacecraft movements as a result of its servo-controlled, four-gimbal, three-axis support structure, shown generally at 4. Stable element 2, acting as the inner gimbal, is surrounded by middle gimbal 6, outer gimbal 8, and support gimbal 10 whch is the casing of the entire structure. Gimbals 2, 6, 8, and 10 are mounted at their respective axes concentrically one within the other in the standard configuration for gimballed structures as shown in FIGURE 1, so as to provide the necessary three degrees of freedom for stable element 2. The particular means of pivotally mounting the gimbals one within the other so as to dampen out the deleterious effects of external vibration on the system is the subject of this invention. FIG. 1 schematically shows three axially-mated pairs of vibration damping mounts 12 in their relation with the gimballed structure 4. One of the mounts 12 positioned between middle gimbal 6 and outer gimbal 8 will be further described as representative of the structure and function of each of mounts 12.

The structure of mount 12 is best shown in FIG. 3. Middle gimbal 6 is fixedly attached to journal 14. Relative rotation of middle and outer gimbals 6 and 8, respectively, is provided by means of conventional ball bearings 16. Inner race 18 of the ball bearing structure is mechanically connected to journal 14 by any suitable means, such as by retaining screw ring 20 and shoulder 22 on journal 14. Outer race 24 is mechanically attached to annular channel member 26 and held by C clip 25. Channel member 26 is so formed as to have a central cylindrical portion 28 and end flanges 30 and 32 which extend radially outward from central cylindrical portion 28. The device further includes annular plate 34 having formed therein a plurality of uniformly spaced circular orifices 36. Orifice plate 34 has a central bore of a diameter which is slightly larger than the outer diameter of central cylindrical portion 28 of channel member 26. Accordingly, when orifice plate 34 is disposed about cylindrical portion 28 of channel member 26, as shown in FIGS. 3 and 4, a slight annular clearance, indicated at 38, exists between the inner periphery of orifice plate 34 and channel member 26. As best shown in FIG. 3, cylindrical flexible bellows 40 is sealingly connected between end flanges 30 and 32 of channel member 26 and the corresponding faces of orifice plate 34 at a position radially outward from the plurality of orifices 36. Thus channel member 26, orifice plate 34, and flexible bellows 40 form a sealed annular compartment 42 which is transversely divided into two sections by orifice plate 34. Sealed annular compartment 42 is filled with damping fluid of a suitable viscosity which can flow between the two sections of compartment 42 through orifices 36 in orifice plate 34 and also through the slight annular clearance at 38 between orifice plate 34 and channel member 26.

The operation of vibration damping mount 12 is as follows: when vibration is encountered by outer gimbal 8, the axial component of this force will produce relative axial movement between outer gimbal 8 and middle gimbal 6. Each of these movements necessitates a flow of the damping fluid within sealed annular compartment 42 from one section of compartment 42 through orifices 36 and annular clearance 38, into the other section of compartment 42. That is to say, any external axial shock or vibration experienced by outer gimbal 8 may be transferred to middle gimbal 6 only through orifice plate 34 and the fluid connection to channel member 26. Therefore, the damping fluid tends to absorb axial shock or vibration and prevent the transfer thereof to journal 14 and middle gimbal 6 attached thereto. While serving to restrain the damping fluid within compartment 42, bellows 40 further acts as a spring to centrally bias orifice plate 34 within channel member 26 so as to allow the system to sustain a continuous unidirectional G loading. The stiffness of bellows 40 can be varied to meet the needs of the system. Although not shown, it is a considered alternative to provide spring stops into channel member 26 between end flanges 30, 32 and orifice plate 34 to produce the same centering effect. A second alternative, also not shown, is to provide a vibration damping mount 12 at only one pivot point of each gimbal, the opposite pivot point being axially rigid. Thus the normal resiliency of the gimbal itself would provide the centering bias and yet considerable axial damping would still be obtained through the use of the single axial vibration damping mount, i.e., the vibration damping mounts do not have to be used in pairs.

While generally only one vibration damping mount 12 has been described, the entire gimballed structure 4 contemplates the incorporation of such a mount at pivotal junctures between each of the gimbals in each of the three axes, either singly or in pairs, so as to damp out vibration and shock in any direction while permitting free relative rotation of the gimbals.

It should now be apparent that the apparatus described herein is uniquely capable of achieving the objects of the invention. The deleterious effects of vibration on the stable element of the spacecraft inertial measurement system are lessened through the use of a relatively simple internally mounted fluid vibration damper. The common problem of leakage is solved by providing a fixed sealed unit with no sliding seals through which fluid can escape.

Although a preferred embodiment of the present invention is shown and described herein, it is to be understood that modifications may be made therein without altering the scope of the appended claims.

What is claimed and desired to be secured by Letters Patent is:

1. A fluid vibration damper comprising:
   an annular channel member having a central cylindrical portion and end flanges extending radially outward from said central cylindrical portion;
   annular plate means slidably and concentrically disposed about said central cylindrical portion of said channel member between said end flanges thereof, and with a restricted annular clearance between said plate means and said central cylindrical portion of said channel member, said annular plate means serving to selectively divide the annular space defined by the channel member into chambers which communicate through the restricted annular clearance; and
   cylindrical flexible means sealingly connected between said radially extending end flanges of said annular channel member and corresponding faces of said annular plate means for containing damping fluid within the annular space defined by said channel member.

2. A fluid vibration damper as defined in claim 1 wherein said annular plate means contains orifices therethrough for further communication between the chambers of the annular space which it divides.

3. A fluid vibration damper as defined in claim 2 including means for biasing said annular plate means along said central cylindrical portion of the channel member at a midway position between said end flanges.

4. A fluid vibration damper as defined in claim 3 wherein said cylindrical flexible means and said biasing means is a bellows member.

5. A fluid vibration damper as defined in claim 2 including a first structural member attached to said annular plate means, rotary bearing means attached to said annular channel member, and a second structural member attached to said rotary bearing means for free relative rotation of said first structural member and said second structural member.

6. A fluid damper as defined in claim 5 wherein said first structural member and said second structural member are concentric gimbals of a gimballed device.

7. A hermitic sealed fluid damper for lessening axial shock and vibration between supporting gimbals of the inertial measurement components of a spacecraft guidance system comprising:
   an annular channel member having a central cylindrical portion and end flanges extending radially outward from said central cylindrical portion;
   an annular orifice plate sildably disposed about said annular channel member between said end flanges thereof, and with a restricted annular clearance between said orifice plate and said central cylindrical portion of the channel member, said orifice plate serving to selectively divide the annular space defined by the channel member into chambers communicating through the orifices in the orifice plate and through the restricted annular clearance;
   bellows means sealingy connected between said end flanges of said annular channel member and corresponding faces of said annular orifice plate for containing damping fluid in the annular space defined by said channel member and for biasing said orifice plate along said central cylindrical portion of the channel member at a midway position between said end flanges;
   a first gimbal member attached to said orifice plate;
   rotary bearing means attached to said annular channel member; and
   a second gimbal member attached to said rotary bearing means for free relative rotation with said first gimbal member.

References Cited
UNITED STATES PATENTS

| | | | |
|---|---|---|---|
| 2,614,896 | 10/1952 | Pierce | 308—26 |
| 3,107,752 | 10/1963 | McLean | 188—87 |
| 3,141,523 | 7/1964 | Dickie. | |
| 3,260,123 | 7/1966 | Dickie. | |

DUANE A. REGER, *Primary Examiner.*

U.S. Cl. X.R.

188—87, 94; 308—26